W. A. SIMPSON & S. KIMBALL.
Alarms for Locomotives to Drive Cattle from the Track.

No. 199,867. Patented Jan. 29, 1878.

Witnesses:
T. C. Brecht
J. A. Rutherford

Inventor:
Wm. A. Simpson &
Samuel Kimball.
By their Attorney
James L. Norris.

UNITED STATES PATENT OFFICE.

WILLIAM A. SIMPSON AND SAMUEL KIMBALL, OF LAWRENCE, KANSAS; SAID SIMPSON ASSIGNOR TO LOUISA B. SIMPSON, OF SAME PLACE.

IMPROVEMENT IN ALARMS FOR LOCOMOTIVES TO DRIVE CATTLE FROM THE TRACK.

Specification forming part of Letters Patent No. 199,867, dated January 29, 1878; application filed June 5, 1877.

*To all whom it may concern:*

Be it known that we, WILLIAM ADAMS SIMPSON and SAMUEL KIMBALL, of the city of Lawrence, in the county of Douglas and State of Kansas, have invented a new and useful machine, device, or appliance for driving cattle and other animals from railroad-tracks before they may be reached or struck by approaching trains, which invention is fully set forth in the following specification, reference being had to the accompanying drawings.

This invention relates to an improved device to be attached to a locomotive for the purpose of driving or frightening cattle and other animals from the track ahead of a train of cars, and preventing the killing of stock and accidents and damages to the trains; and it consists in a series of diverging nozzles, branching from a common pipe proceeding from the boiler, and projecting horizontally in front of the locomotive, above the pilot or cow-catcher, said pipe being provided with a cock under the control of the engineer, by means of which hot water or steam, or the two combined, may be projected in front of the locomotive upon the cattle or animals on or near the track, in order to frighten or drive them out of the way.

Figure 1:
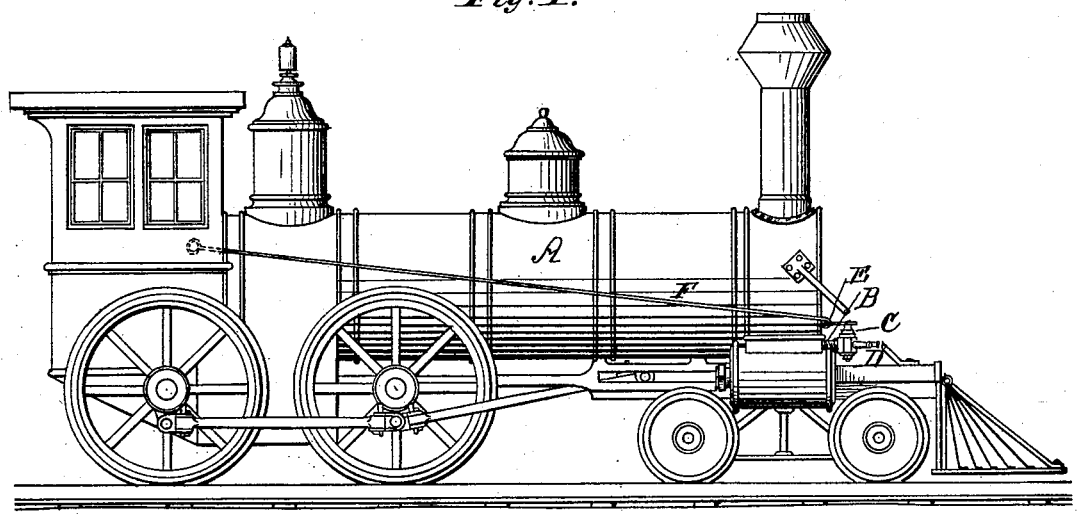
Figure 2:
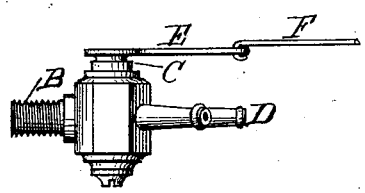
Figure 3:
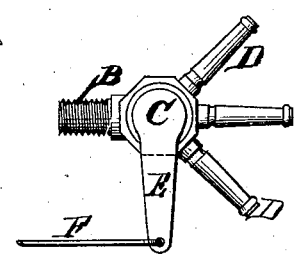
Figure 4:
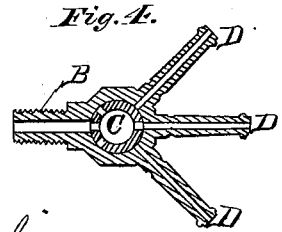

In the drawing, Figure 1 represents a side elevation, showing our improvement; Fig. 2, a detached side view of the device; Fig. 3, a detached top view, and Fig. 4 a horizontal section, of the same.

The letter A represents an ordinary locomotive, and B a pipe extending from the boiler at any convenient point, preferably, however, at some point near the front and below the water-line. Said pipe projects in front of the locomotive, and is provided at its outer end with a stop-cock, C, and one or more nozzles, D, through which a current of hot water or steam, or both, may be projected in front of the locomotive by means of the pressure in the boiler, the stop-cock being supplied with suitable connections, by means of which it can be brought under the control of the engineer.

In the present instance the nozzles D are represented projecting from the pipe B. Said nozzles are preferably made to diverge, as shown, so as to throw the hot water or steam to each side of the track, as well as directly in front of the locomotive.

The stop-cock C is provided with a lever, E, from which extends a rod, F, backward to the cab of the locomotive, by means of which the cock may be operated to project the steam or hot water, or both, through the nozzles, when desired.

The operation of our device is apparent from the above description. When the engineer perceives any animals ahead of his train he has simply to turn on the hot water or steam through the nozzles, and the noise occasioned thereby will tend to frighten the animals off; but should it fail in doing so, when the train approaches near enough to the animals, the hot water projected upon them will effectually drive them from the track, thus saving the stock, and preventing accidents and damage to the train.

What we claim, and desire to secure by Letters Patent, is—

In combination with the boiler of a locomotive, a series of diverging pipes projecting in front of the locomotive above the pilot or cow-catcher, and communicating with the boiler, said nozzles being provided with a stop-cock, by means of which hot water or steam, or both, may be projected in front and to the sides of the locomotive, substantially as and for the purposes specified.

WILLIAM ADAMS SIMPSON.
SAMUEL KIMBALL.

Attest:
BENJAMIN A. AMBLER,
L. M. H. WOOD.